United States Patent
Gajdos

[15] 3,669,139
[45] June 13, 1972

[54] SERVICE TOOL FOR GAS MAINS
[72] Inventor: George Gajdos, 200 Lexington Avenue, Oyster Bay, N.Y. 11771
[22] Filed: Oct. 26, 1970
[21] Appl. No.: 83,873

[52] U.S. Cl. .................................................137/317, 138/89
[51] Int. Cl. ...............................B23b 41/08, F16e 41/04
[58] Field of Search ....................137/317, 318, 319; 138/89, 138/92

[56] References Cited

UNITED STATES PATENTS

| | | | |
|---|---|---|---|
| 3,533,424 | 10/1970 | Wedge | 137/318 X |
| 2,867,243 | 1/1959 | Bowan | 138/89 |
| 2,763,282 | 9/1956 | Reedy et al. | 137/318 |
| 3,032,069 | 5/1962 | Ficklin | 138/89 |
| 545,968 | 9/1895 | Mueller | 137/318 X |
| 2,171,576 | 9/1939 | Larry et al. | 137/317 X |
| 2,237,476 | 4/1941 | Cline | 137/318 X |

*Primary Examiner*—M. Cary Nelson
*Assistant Examiner*—David R. Matthews
*Attorney*—Bauer & Amer

[57] ABSTRACT

In the servicing of gas mains or the like, in the preparatory procedures for which a seal is achieved by substituting a thrust plug for a rotary, threaded plug to permit repair or other maintenance service to the main without leakage, the use of an improved service tool or apparatus having a body which is readily assembled on the main outlet pipe to define a sealable passage thereon, and having a shaft or rod capable of being manipulated in axial and rotative movements within said passage. As a consequence of the rotative movement, the threaded plug is removed clearing a path along which access is gained to the main outlet opening, following which the thrust plug is installed by an axial stroke of said rod.

12 Claims, 7 Drawing Figures

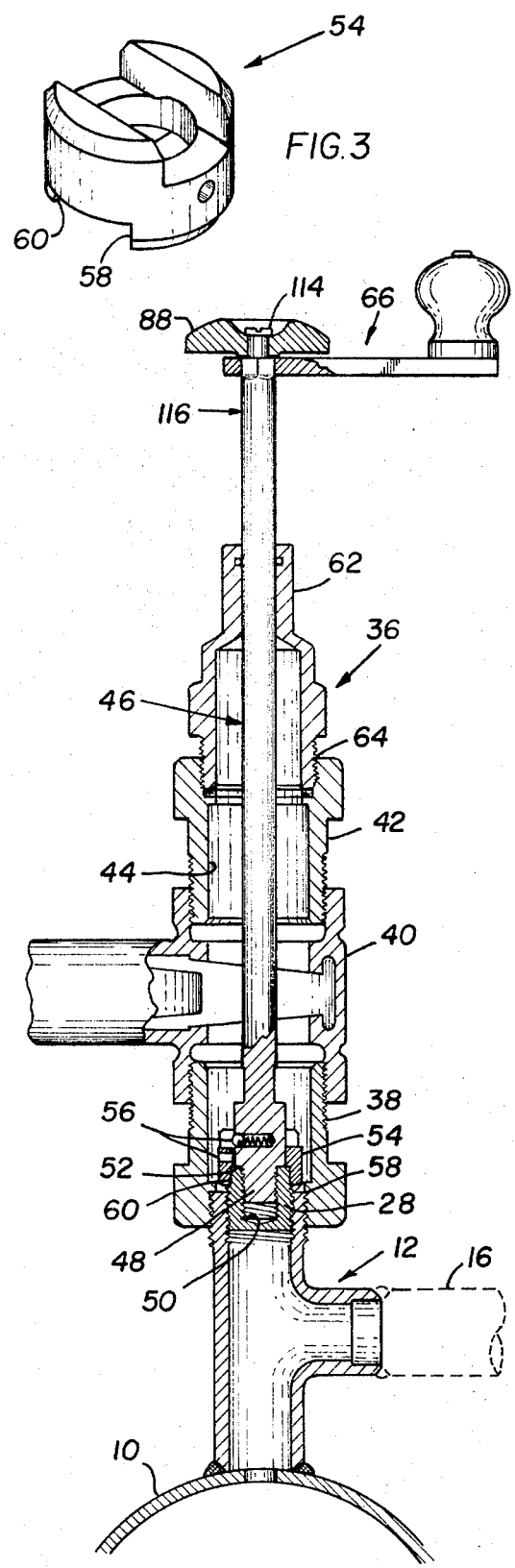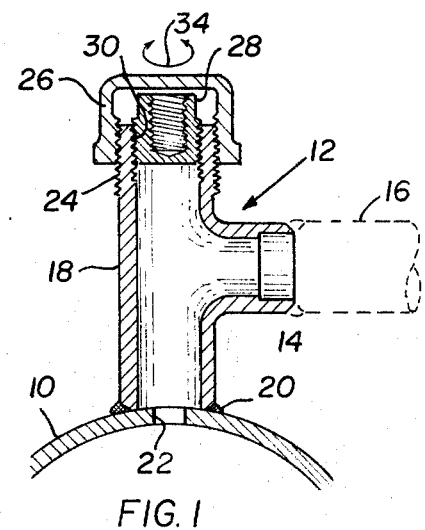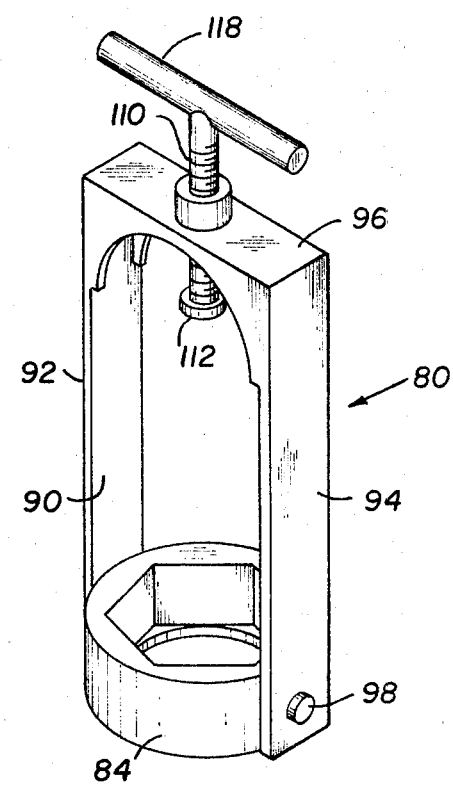

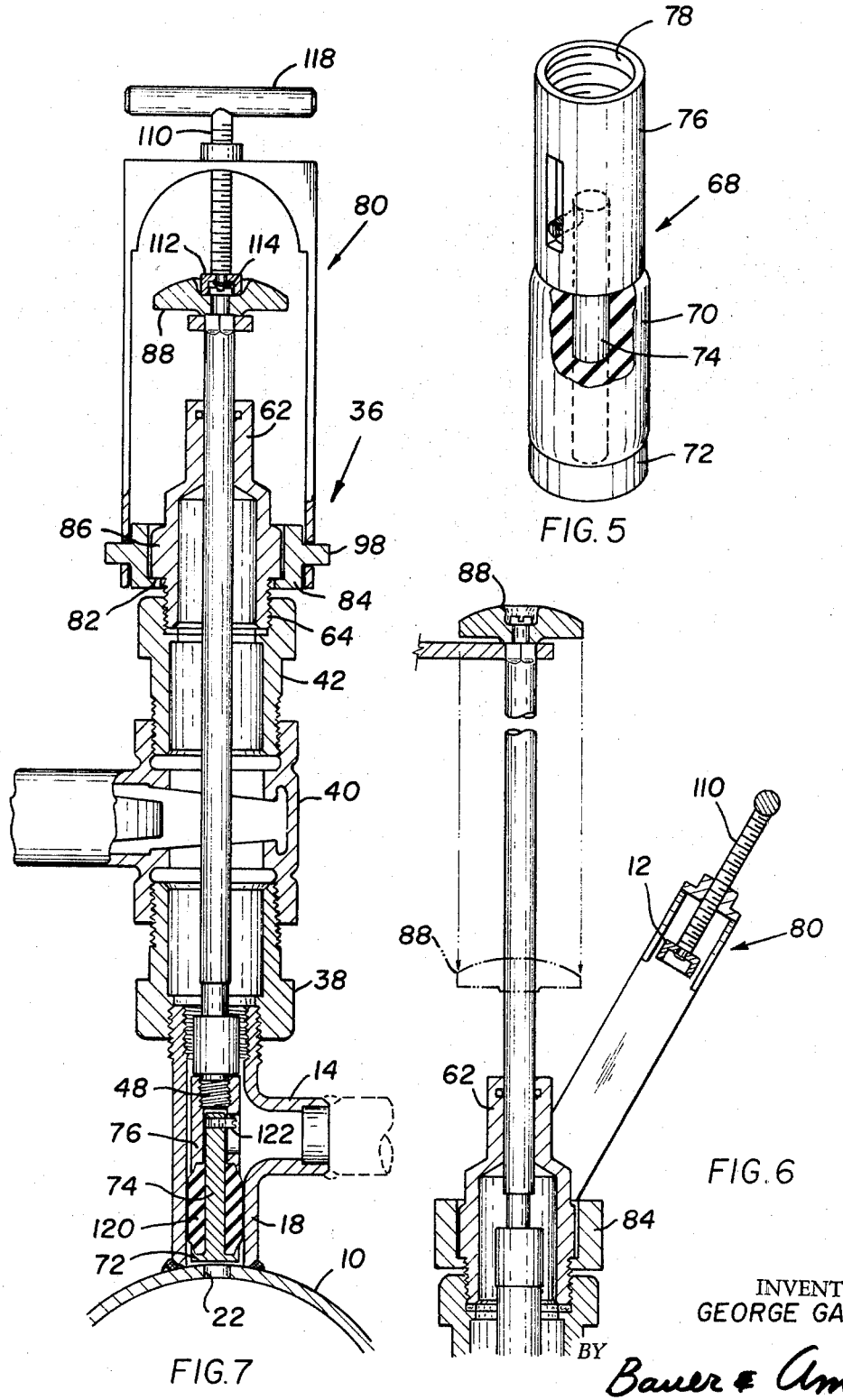

SERVICE TOOL FOR GAS MAINS

The present invention relates generally to service tools for gas mains or the like, and more particularly to improvements for a tool, advantageously compact for field use, for sealing the main preparatory to performing repair or other service operations thereon.

Mains for gas or the like, and more particularly the T-shaped outlet pipe connections therefrom, are normally sealed with a threaded plug. This plug, moreover, requires removal to gain access to the communication opening between the main and outlet pipe, which opening must be sealed against leakage to provide safe conditions for repair and maintenance service to the main. Thus, a single service tool to properly seal the main must be capable of both rotative and axial movements, and yet be of a size and readily simple to construct as to be appropriate for field use. Such service tools as are presently available, however, while being readily manipulated in rotative movement to remove the first plug, additionally all have massive constructions and unduly complicated modes of operation to achieve the axial stroke, under the required pressure, as is necessary to install the thrust plug in sealed relation within the main outlet opening. These features of known tools would create problems under ideal conditions of use, and thus are particularly troublesome during attempts to use the tool in the field and in adverse weather conditions.

Broadly, it is an object of the present invention to provide an improved gas main service tool overcoming the foregoing and other shortcomings of the prior art. Specifically, it is an object to provide a tool that is easily and quickly assembled on the outlet pipe, and has an inner operative member that is readily worked, from the outside, through the necessary degrees of movement to both remove and install the sealing plugs.

A tool appropriate for servicing gas or similar mains which demonstrates objects and advantages of the present invention includes threadably engagable pipe sections adapted to be assembled in superposed relation on the pipe outlet to define a sealable passage, and a rod operatively disposed in the passage readily manipulated, at its proximal end, so that the distal end thereof engages and rotatively removes a first plug and thereafter, incident to an axial thrust, causes the sealed placement of a thrust plug within the pipe main outlet opening. The axial thrust is achieved using a threaded member which is pivoted into a clearance position above the rod and then threadably adjusted downwardly to effectively drive the rod through corresponding downward axial movement within the passage.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a sectioned side elevational view of a gas main and outlet pipe connection therefrom in its usual operating condition;

FIG. 2 is another side elevational view of the gas main and outlet pipe connection therefrom and also includes the service tool hereof applied to the outlet pipe connection;

FIG. 3 is a perspective view, on an enlarged scale, of an attachment for removing the threaded plug of the outlet pipe connection;

FIG. 4 is an isolated perspective view of a yoke used as part of the service tool;

FIG. 5 is a perspective view of a thrust plug for the gas main; and

FIGS. 6 and 7 illustrate the manner of using the yoke of FIG. 4 in conjunction with the service tool hereof, namely to wit:

FIG. 6 is a partial side elevational view illustrating the service tool in an early stage during the placement or installation of the thrust plug of FIG. 5; and FIG. 7 illustrates the condition of the service tool after complete installation of the thrust plug.

Reference is now made to the drawings, and in particular to FIG. 1, wherein there is shown a partial section of a main 10 for the transmission of gas or the like having a T-shaped outlet pipe connection 12. As generally understood, a branch 14 is appropriately connected to a conduit 16 which, at its remote end, is connected to a dwelling or the like where the transmitted gas or fluid is used. As is further generally understood, the vertical branch 18 is appropriately connected to the main 10, as by welding 20, about an opening 22 through which the gas is transmitted from the main 10 to the service conduit 16. At its opposite end, the pipe branch 18 terminates in a section 24 which has both internal and external threads, the former being threadably engaged with a cap 26, and the latter with a plug 28. As may be readily appreciated, plug 28 must be either engaged or disengaged from the threaded section 24 by rotative movement. Further as may be readily appreciated, preparatory to servicing of the gas or fluid transmission system consisting of the previously noted pipes 10, 12 and 16, it is necessary to plug or seal off the communication opening 22 so that there is no leakage of gas or fluid from the main 10. As will be described in greater detail subsequently, in achieving the sealing of the communication opening 22, use is made of an apparatus which, following removal of the plug 28 and thus the unblocking of the path to opening 22, and through the vertical branch 18 into an operative position in which access can be gained to the opening 22 for the purposes of depositing a thrust plug in sealing relation within the opening 22. Thus, in depositing the thrust plug, the apparatus must partake initially of rotative movement 34, in removing the plug 28, and subsequently of axial movement 32 in actually installing the thrust plug.

Referring more specifically to FIGS. 2 and 3, it will be noted that removal of the plug 28 is achieved using the apparatus or device generally designated 36. First, however, the cap 26 is removed using a wrench or the like. Next, the apparatus 36 is erected or assembled upon the pipe connection 12 in the sequence now to be described. The assembly includes threadably engaging a lower cylindrical body section 38 to the external thread of the pipe branch 18, followed by the threaded engagement to it of a gate valve 40 which is next threadably engaged by an upper body section 42. The sections 38, 42 and valve 40 thus cooperate to define an internal passage 44 through which an elongated shaft or rod-like member 46 is projected preparatory to the removal of the plug 28.

More specifically, the plug removal procedure involves the threaded engagement of the threaded distal end 48 of member 46 with a blind threaded opening 50 in the plug 28. This threaded engagement is carried out until shoulders formed in the distal end 48 seat, as at 52, upon the plug 28. Next, a plug-removal attachment 54 which, up to this point is held in an elevated position by detent means 56, is urged from this elevated position into its lower operative position in which depending flats 58 and 60 thereon (see in particular FIG. 3), engage cooperating flat surfaces in the upper peripheral portion which bounds the upper end of the plug opening 50.

At this point, it is advantageous to lower holding member 62 from its position adjacent the proximal end of the member 46 into threaded engagement, as at 64, with the upper body section 42. Rod 46 is next conveniently rotated by crank 66 through that direction of rotative movement appropriate to disengage the plug 28 from the threaded opening 30. Following this, member 46 is conveniently raised to where the removed plug 28 is above the level of the gate valve 40 and the gate valve 40 then closed to prevent the leakage of gas past this point in the assembled construction.

Member 62 is then disengaged from the upper body section 42 and the member 46 removed from the assembled construction 38, 40 and 42 which, in turn, permits removal of the plug 28 from the distal end 48 of the member 46.

Placement of the thrust plug, which is the next contemplated procedure in the service of the gas main 10, can best be understood by reference to FIGS. 4–7. The thrust plug may be of a conventional type, as illustrated and generally designated 68 in FIG. 5. Specifically, plug 68 includes an elastomeric body 70 mounted on a base 72 and about an internal stem 74. Disposed for sliding movement along the stem 74 so as to cause outward bulging and compression of the elastomeric body 70, all in a well understood manner, is a rigid, hollow member 76 which has an upper threaded section 78 to facilitate the threaded attachment of the thrust plug 68 to the threaded distal end 48 of member 46.

After threading the thrust plug 68 on the distal end 48, rod 46 is again in condition to be thrust axially, in the direction 32, through the internal passage 44. Prior thereto, a yoke 80, as illustrated in FIG. 4, is slipped about the member 62 so that the circular shoulder 82 formed in a ring-like base 84 of the yoke 80 engages a lateral ring-like projection 86 formed about the exterior of the body of the member 62. The reason for this, as well as a more detailed description of the structure of the yoke 80, will be provided as the description proceeds.

Following the fitting of the yoke 80 on the device 36, as just described, member 46 with the thrust plug 68 on the distal end thereof is again placed within the upper body member 42, and member 62 is then threadably engaged, as at 64, to the upper body member 42 so as to provide a construction which is reasonably sealed against leakage of the gas to atmosphere. Next, gate valve 40 is opened and member 46 is projected past the gate valve 40 until the thrust plug base 72 abuts against the portion of the gas main bounding the communication opening 22.

As is perhaps best illustrated in FIG. 6, the result of this axial movement of the member 46 is the lowering of a hand grip 88 to a position, as illustrated in phantom perspective in FIG. 6, where it falls within the confines or operative area 90 which is bounded by the bifurcated arms 92 and 94 which extend from the yoke base 84 and by a horizontally oriented head piece 96 connected between these arms. As a consequence, the upper portion of the yoke which is pivotally connected, as at 98 to its base 84, is adapted to be pivoted from its out-of-the-way clearance position, as illustrated in FIG. 6, into its vertically oriented position relative to the member 46, as illustrated in FIG. 7. Following this pivotal movement of yoke 80, a pressure-applying threaded member 110, which is appropriately threadably disposed in the head piece 96, is in an advantageous aligned position for engagement by its depending end 112 with the member 46. Specifically, a cooperating interfitting member 114 at the upper proximal end 116 of member 46 accommodates the depending end 112, and member 46 is thereafter urged through axial movement 32 in response to threaded adjustment of the pressure-applying member 110. This threaded adjustment is facilitated by the handle 118.

As a consequence of the threaded adjustment of member 118, yoke 80 is initially lifted up along the member 62 until there is a seating of shoulder 82 with the lateral projection 86, and thereafter the member 46 is thrust downwardly in the axial direction 32 and in an obvious manner results in the placement of the thrust plug 68 in sealing relation about the communication opening 22. Specifically, the rigid sleeve 76 presses firmly into the elastomeric body 70 causing a bulging in this body and thus the sealing contact thereof, as at 120, with the internal surfaces of the lower portion of the branch 18. With the achievement of this seal, it is of course safe to remove the conduit 16 for servicing and maintenance. Moreover, if a prolonged shut-off is contemplated, a set screw 122 can be manipulated through the pipe connection horizontal branch 14 to hold the position of the sleeve 76 relative to the stem 74 and thereby permit the removal of the device 36.

From the foregoing, it should be readily appreciated that there has been described herein a device or service tool 36 for the sealing of a gas main 10 which is simple in construction and readily easy to utilize in the field. Specifically, despite its compact size, the device 36, and more particularly the operative member 46 thereof, is readily capable of being urged through both rotative and axial movements within a sealed construction, the rotative movement permitting the initial removal of the rotative plug 28 and the axial movement the subsequent placement of the thrust plug 68.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. In combination, a pipe main for flowing gas or the like and an outlet connection pipe therefrom, said main and connection pipes having a communication opening therebetween and said connection pipe having a removable threaded plug in facing relation to said communication opening, and an improved apparatus for removing said threaded plug and thereafter placing a thrust plug in sealing relation within said communication opening, said apparatus comprising an elongated hollow body having an operative attached position to said connection pipe so as to define an internal passage therealong providing access to said threaded plug, an elongated member terminating in opposite distal and proximal ends disposed in said internal passage having rotative and axial movements therein, a first attachment for said elongated member distal end for engaging said threaded plug preparatory to the removal thereof incident to said rotative movement of said elongated member, a second attachment for said elongated member distal end for engaging said thrust plug preparatory to the placement thereof in said communication opening, a yoke including a headpiece pivotally attached to said apparatus body for movement to and from an overlying operative clearance position about said proximal end of said elongated member, and a threadably adjustable member between said yoke and said elongated member proximal end and effective, upon threading adjustment when said yoke is in said overlying operative clearance position, to urge said elongated member through said axial movement so that said thrust plug is forced into said sealing relation with said communication opening.

2. A combination as claimed in claim 1 wherein said pivotal attachment of said yoke enables the same to be pivoted into a position clear of the axial path of movement of said elongated member so as to facilitate the positioning of said elongated member within said internal passage.

3. A combination as claimed in claim 1 wherein said hollow body consists of plural sections having cooperating threads thereon effective to enable the threaded assembly of said plural sections to said connection pipe.

4. The combination as claimed in claim 1 wherein said elongated member has a threaded section at said distal end and is adapted to be threadably engaged to said threaded plug and said thrust plug.

5. A combination as claimed in claim 4 wherein said elongated member has a crank at said proximal end to facilitate the manipulation thereof through said rotative movement.

6. In combination, a pipe main for flowing gas or the like and an outlet connection pipe therefrom, said main and connection pipes having a communication opening therebetween and said connection pipe having a removable threaded plug in facing relation to said communication opening, and an improved apparatus for removing said threaded plug and thereafter placing a thrust plug in sealing relation within said communication opening, said apparatus comprising plural threadably engagable sections adapted to be constructed on said connection pipe so as to form a hollow body defining a sealable chamber adjacent said threaded plug, an elongated member having an operative position partially projected within said chamber and arranged for rotative and axial movements therein, a yoke pivotally attached to said body pivotally movable into an operative clearance position about said end of said elongated member projected from said chamber, and a threadably adjustable member arranged between said yoke and said elongated member proximal end effective, upon threaded adjustment, to urge said elongated member through said axial movement incident to forcing said thrust plug into said sealing relation with said communication opening.

7. A combination as claimed in claim 6 wherein said hollow body includes a valve to facilitate the positioning within and removal of said elongated member from said chamber while maintaining the sealed condition thereof.

8. The combination as claimed in claim 6 wherein said elongated member has a threaded section at its distal end and is adapted to be threadably engaged to said threaded plug and said thrust plug.

9. A combination as claimed in claim 8 wherein said elongated member has a crank at its proximal end to facilitate the manipulation thereof through said rotative movement.

10. A service tool comprising plural threadably engageable sections adapted to be interconnected so as to form a hollow body defining a sealable elongated chamber, an elongated member terminating in opposite proximal and distal ends having an operative position partially projected within said chamber, a crank on said member proximal end for manipulating the distal end thereof through rotative movement, a yoke pivotally attached to said body and including a headpiece pivotally movable to and from an operative clearance position overlying said crank, and a depending threadably adjustable member arranged between said yoke and said elongated member proximal end and effective, upon threaded adjustment when said headpiece is in said overlying operative clearance position, to urge said elongated member through axial movement along the longitudinal axis of said elongated chamber.

11. A combination as claimed in claim 10 wherein said hollow body includes a valve to facilitate the positioning within and removal of said elongated member from said chamber while maintaining the sealed condition thereof.

12. The combination as claimed in claim 10 wherein said elongated member has a threaded section at its distal end and is adapted to be threadably engaged to a cooperating threaded plug incident to the installation thereof during the servicing of a gas main or the like.

* * * * *